April 23, 1929.  W. R. HUME  1,710,258
ELECTRIC WELDING APPARATUS
Filed Aug. 28, 1924  2 Sheets-Sheet 1

Inventor:
Walter Reginald Hume
By *[signature]*
Attorney

Patented Apr. 23, 1929.

1,710,258

UNITED STATES PATENT OFFICE.

WALTER REGINALD HUME, OF MELBOURNE, VICTORIA, AUSTRALIA.

ELECTRIC WELDING APPARATUS.

Application filed August 28, 1924, Serial No. 734,716, and in Australia September 19, 1923.

This invention relates to automatic and semi-automatic welding machines of the arc type as employed in welding together the meeting edges of plates or sheet metal pipes and for other purposes.

One of the objects of the invention is to provide apparatus of the above type in which the electrode is automatically fed towards the work, and the work is also preferably traversed past the electrode by fluid operated means (preferably hydraulic) such as a cylinder and piston or a float adapted to rise and fall in a tank of liquid whereby the electrode is fed slowly forwards according to the movement of the fluid operated piston or float, and the work (or the electrode) is simultaneously traversed by similar means. Operation of the apparatus hydraulically as above mentioned ensures smooth and effective working of the apparatus the electrode being fed and the work traversed in relation thereto in a gradual and regular manner which is highly suited for the purpose in view.

Another object of the invention is to provide means whereby the electrode is fed and the work relatively traversed in synchronism therewith by a common fluid operated device such as the hydraulic piston and cylinder referred to. To effect this dual function the piston may be connected by a flexible operating line or wire, passing over suitable guide pulleys, to the work or a traversing carriage on which the work rests, this carriage or a part moving with the work being similarly connected by a flexible operating line to the electrode so that the latter is fed forwardly to the work in synchronism with the traversing movement of the latter.

A further object of the invention is to provide means whereby the rate of feed of the electrode may be readily adjusted in relation to the rate of relative traverse of the work so that more or less electrode may be supplied and consumed for a given length of welded joint, such adjustment being associated with the fluid operated mechanism whereby the feeding and traversing movements are effected.

Another object of the invention is to provide an electro-mechanical device for controlling the supply of fluid which operates the electrode feed and the traversing of the work as aforesaid, such electro-mechanical control being adapted to automatically vary the rate and direction of said electrode feed and traversing movements in accordance with fluctuations in the electric current passing through the electrode.

A still further object is to provide a grooved mandrel or bearer adapted to bear against the inner or under side of the joint being formed so that the molten metal is collected within said groove to ensure an effective welded joint as hereinafter described. The invention also provides a collapsible support or bag for said mandrel or bearer whereby the latter may be pressed closely against the joint to be formed and will accommodate itself to work of varying sizes, such for instance as the interior of sheet metal pipes of different diameters, in the welding of the longitudinal or circumferential meeting edges of such pipes or tubes. By admitting fluid such as water into this collapsible support or bag it is expanded to press the mandrel against the joint as aforesaid, whilst at the same time the fluid within the collapsible support exercises an advantageous cooling influence on the mandrel or bearer.

A still further object of the invention is to provide an automatic arc striking device embodying an electromagnet which is adapted to withdraw the point of the electrode to the proper arc distance from the work immediately the point of the electrode is brought sufficiently close to the work to cause the current to flow and said electromagnet to be energized.

A machine constructed in accordance with the invention permits the use of a relatively thick or heavy gauge electrode which can be suitably coated with fluxing material if necessary. In existing automatic arc welding machines it is customary to feed a relatively light gauge coiled electrode in a bare state to the work but this thin coiled electrode does not permit of sufficient penetration or fusing power to effectively weld a thick plate. The present machine is designed to hold an electrode in the form of a straight rod of sufficient length and of any desired gauge or thickness according to the penetration or fusing power required at the joint. The improved machine may thus effectively weld through relatively heavy plates without the necessity of bevelling and consequently reducing the thickness of the edges to be joined as is usually necessary with the thin coiled electrodes at present commonly used in automatic arc welding machines.

Various other objects and features of the invention will be readily understood from the following description and the appended claims.

But in order that this invention may be better understood reference will now be made to the accompanying sheet of drawings which are to be taken as part of this specification and read herewith:—

Figure 6 is a semi-diagrammatic view illustrating the application of the invention to the welding of circumferential joints such as in joining together the ends of metal pipes. Various parts are omitted for convenience of illustration.

Figure 7 is an enlarged detail view showing a grooved mandrel or bearer applied to the formation of a joint between the longitudinal meeting edges of a sheet metal pipe.

Figure 8 is a view similar to Figure 7 but showing the grooved mandrel or bearer in the form of a wheel or roller.

Figure 9 is a fragmentary side view of the arrangement shown in Figure 8.

Figure 10 shows the mandrel or bearer of Figures 8 and 9 applied to the formation of a circumferential joint. In Figures 7 to 10 the electrode and its guide are indicated in broken lines.

Figure 11 is a cross sectional view similar to Figure 7 but showing the grooved mandrel or bearer mounted on a collapsible support consisting of a flexible sleeve or bag which is adapted to contain fluid such as water to press the mandrel outwardly against the joint.

Figure 12 is a fragmentary longitudinal section of the arrangement seen in Figure 11.

In the drawings which illustrate suitable embodiments of the invention the numeral 2 indicates a main framework or foundation of the apparatus carrying tracks or rails 3 upon which run the wheels 4 of a traversing carriage or truck 6. Upon this carriage the work 7, here shown as a sheet metal pipe the meeting edges 8 of which are to be welded together, is placed.

The work carriage 6 is connected by a flexible operating line 5, such as a wire, cable or the like, passing over guide pulleys 10 to a fluid operated member such as a piston 9 working within a hydraulic cylinder 11.

In order to feed the electrode 12 simultaneously with the traversing movement of the work a second flexible operating line 13 connects the carriage 6 or some other part moving with the work, to an electrode holder or carrier 15 which is adapted to receive the rear or upper end of the electrode rod 12 so that the lower end or point of the latter is fed slowly forward to the work as the work is traversed in relation thereto.

In order to vary the rate of the electrode feed relatively to the rate of traverse of the work, an adjusting device may be interposed in this second operating line 13 which is thus divided into two sections hereinafter termed a front section and a rear section. The forward end of the front section is connected to a winding drum or winch 17 on the work carriage 6 whilst its other end is connected to the adjusting device which preferably consists of a pivoted lever 18 having a series of adjusting holes or connections 19 spaced longitudinally thereof. The other or rear section of the second operating line 13 is connected at its forward end to the pivoted lever 18 whilst its rear end is connected to the electrode holder 15, both sections of the line 13 passing over suitably arranged guide pulleys 21.

By means of the adjusting holes or connections 19 the relative positions of the two adjacent ends of the front and rear sections of the operating line 13 may be adjusted along the lever 18 so that the swinging movement imparted to this lever by the traversing motion of the work, may be increased or reduced in the feeding movement which is transmitted to the electrode through the line 13. Thus the work may be traversed and the electrode fed at the same or at different relative speeds according to the amount or length of electrode it is desired to deposit along a given length of joint.

The electrode holder 15 may be provided with guide rollers 23 which are adapted to run on angularly adjustable guide bars 24, the lower ends of which are pivotally connected as at 26 (Figure 2) to brackets 27 vertically adjustable upon uprights 28 secured to the main framework 2. The angular attitude of the guide bars 24 and of the electrode 12 may be adjusted according to requirements, such, for instance, as for different heights or diameters of the work 7, by shifting an adjusting pin 31 into different adjusting holes 32 which are spaced longitudinally of a horizontal bar 33, the guide bars 24 turning about their pivotal points 26 and being also vertically adjustable on the uprights 28 as before mentioned. The horizontal bar 33 may be securely fastened to uprights 34 fixed, for instance, to the hydraulic cylinder 11 and adapted if desired to form guides for the piston 9.

Figures 1, 2:
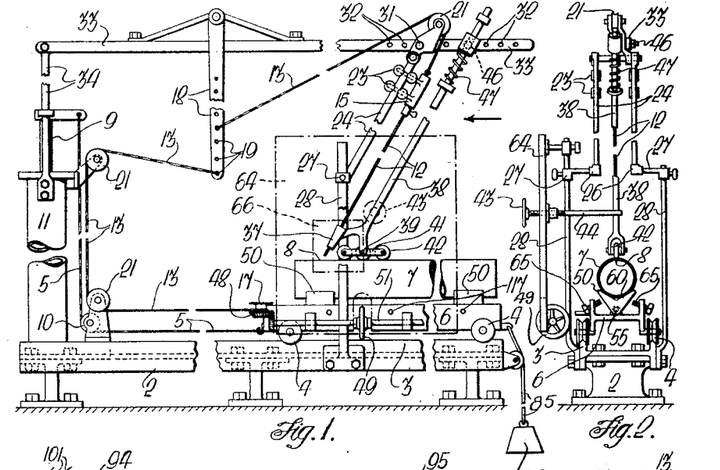
Figure 1 is a side elevation of an electric arc welding apparatus in accordance with a practical embodiment of the invention. Parts are broken away and omitted for convenience of illustration, and an instrument board is indicated in broken lines.
Figure 2 is an end view looking in the direction of the arrow in Figure 1.
Figures 6, 7, 8, 9, 10, 11, 12:
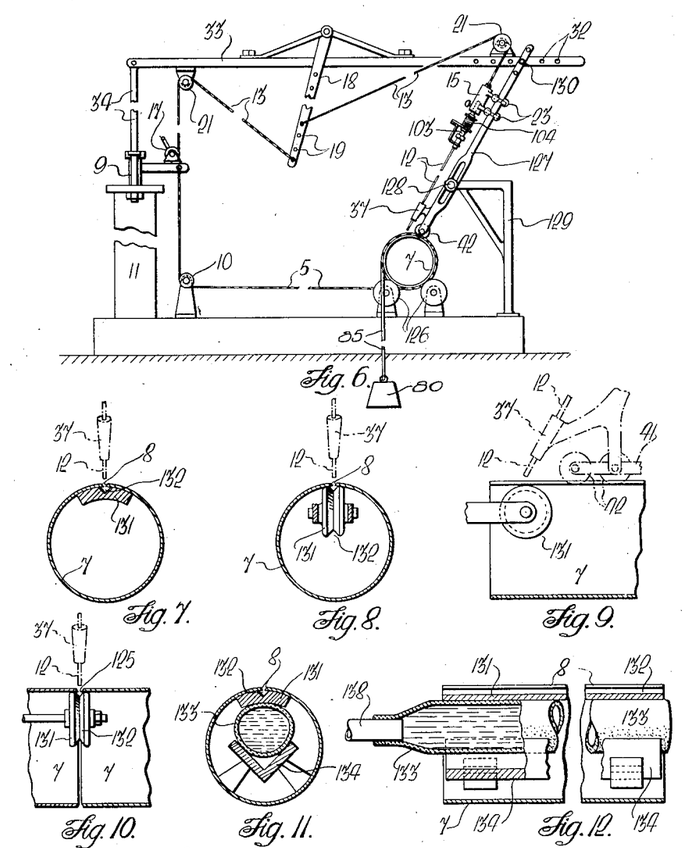

The lower portion of the electrode 12 which is in the form of a straight rod of any desired gauge or thickness as previously mentioned, passes freely through a guide sleeve 37 carried by a supporting rod or member 38, which is pivoted as at 39 to an intermediate pivot rocking bar 41 supported by guide wheels 42 which are adapted to run along the joint to be welded such as in the groove or space formed between the longitudinal meeting edges 8 of a sheet metal pipe, as indicated in Figures 2 and 9. Prior to the formation of the welded joint it is customary to temporarily unite such meeting edges by "tacking" or spot welding them together at intervals. These spot welded points form obstructions in the path of the guide wheels 42, but owing to the pivotal movement of the rocking bar 41 about the point 39, the wheels 42 are permitted to run freely over such obstructions so that the point of the electrode is effectively guided against lateral movement during the traversing of the work in relation thereto.

To laterally adjust the point of the electrode 12 with the guide wheels 42, a hand wheel 43 operating a transversely disposed screw threaded rod 44 may be provided. The inner end of this rod may be attached to the member 38 so that the lower end of the latter may be adjusted laterally with the electrode guide 37 and the rocking bar 41 which carries the guide wheels 42. The upwardly extending rod 38 may be held in the desired angular attitude by means of an adjusting pin 46 which engages with the adjusting holes of the horizontal bar 33 and permits the upper end of said rod to be adjusted in accordance with the height of the work and the attitude of the electrode. A spring 47 serves to press the guide wheels 42 downwardly against the work so that they are kept in the groove between the meeting edges to be joined.

In order to automatically extinguish the arc in the event of the guide wheels 42 and the electrode leaving the proper line of the joint, the work carriage 6 may be provided with a cradle 50 (Figure 2) pivoted on a longitudinal axis as at 55, to the carriage 6 and having a V shaped bed or surface 60 on which the work rests. The work and the pivoted cradle 50 are held in proper balanced position about the axis 55 by the pressure of the guide wheels 42 in the jointing groove between the edges as seen in Figure 2, but should the guide wheels accidentally leave this groove, and the point of the electrode thus move laterally from its proper path, the cradle 50 with the work thereon will swing sidewardly about the pivotal point 55, so that owing to the work moving away from the electrode, the arc will be automatically extinguished until the parts are restored to their proper positions to resume the welding operations. Adjustable stops 65 may be provided on the carriage 6 to limit the sideward movement of the cradle 50 with the work.

The winding drum or winch 17 may be connected by suitable gearing 48 to a hand wheel 49 which turns with but is slidably mounted on a shaft 51 attached to the traversing carriage 6. Thus by operating said hand wheel the operating line 13 may be wound onto or off the drum 17 to thereby move the electrode away from or towards the work without movement of the carriage 6 so that the point of the electrode may be brought to a suitable position adjacent the work when welding operations are to be commenced. It will be evident that this hand adjustment of the electrode is independent of the movement of the work carriage and the fluid operated piston 9, whereas when the welding operation is in progress, the work and the electrode move simultaneously and at the desired relative speeds according to the adjustment provided by the holes 19 in the lever 18.

To control the supply of fluid to the hydraulic cylinder 11 whereby the electrode and the work carriage are operated as aforesaid, a suitable control valve indicated at 54 (Figure 3) may be inserted in the fluid supply pipe 56 through which the operating fluid passes to the cylinder 11 from a hydraulic accumulator or other suitable source. This control valve 54 is provided with hand adjustment means, such for instance, as an arm 57 operated by a screw 58 whereby the valve 54 may be initially opened to permit a suitable quantity of fluid to pass to the cylinder 11 when commencing welding operations.

Figures 3, 4, 5:
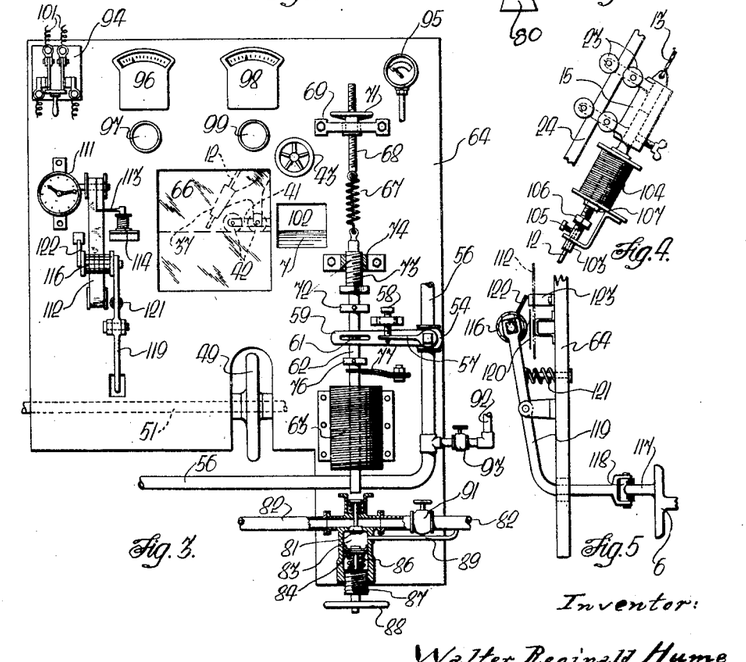
Figure 3 is an enlarged part sectional side elevation showing the instrument board which is indicated in broken lines in Figure 1, and various parts mounted on or adjacent said instrument board.
Figure 4 is a detail view of an automatic arc-striking device in accordance with the invention.
Figure 5 is an enlarged end view of a device for automatically recording the amount or length of work welded within given periods as the work is traversed in relation to the electrode. This feature is shown in front elevation in Figure 3.

When the apparatus is thus started by the admission of fluid to the cylinder 11 the fluid supply and consequently the electrode feed and traversing movements may be automatically controlled by means of an arm or lever 59 which is also attached to the control valve 54 and is operatively connected as at 61 to a sliding rod 62 which may be attached to or form part of the core or moving element of an electromagnet such as a solenoid 63 which is wound in circuit with the electrode 12 so that fluctuations in the current passing through the electrode also pass in the solenoid. The solenoid 63 and various other parts as illustrated in Figure 3 may be conveniently mounted upon an instrument board 64 having a smoked glass or other suitable window 66 through which the operator may observe the progress of the work.

One end of the sliding solenoid rod 62 is connected by a tension spring 67 to an adjusting screw 68 which passes through a supporting bracket 69 on the instrument board 64 and is fitted with an adjusting nut 71 whereby the tension of the spring 67 may be adjusted to vary the strength of its pull against the action of the solenoid 63 according to requirements.

To limit the opening movement of the control valve 54 a limit stop 72 may be provided on the sliding rod 62. This stop being adapted to engage an adjustable stop such as a hollow screw 73 through which the rod 62 freely passes. The adjustable stop 73 may be threaded through a lug or bracket 74 on the instrument board 64 so that by adjustment of this stop in relation to the co-operating stop 72 on the rod 62, the upward movement of the arm 59 and consequently the opening movement of the control valve 54 may be regulated according to the maximum supply of fluid required.

The solenoid rod 62 also carries a stop 76 which is adapted to control the downward movement of the arm 59 and consequently the closing movement of the valve 54 by engagement of the stop 76 with a co-operating stop 77 which is preferably in the nature of a plate spring having one or more leaves or laminations whereby the strength of the spring may be varied according to requirements. This stop 77 will under normal conditions arrest the downward movement of the solenoid rod 62 and the consequent closing movement of the valve 54 to avoid any excessive downward movement of the arm 59 when said valve is in an appropriate position for normal working, should, however, an excessive current pass through the solenoid 63, as, for instance, owing to the shortening of the arc gap or to fluctuations in the current supply, the yielding nature of the stop 77 will permit the rod 62 to move downwardly past its cut off position and thus operate a release valve as hereinafter described.

The above-mentioned release valve is indicated at 81 and is associated with a pressure release pipe 82 connected with the hydraulic cylinder 11 so as to release the pressure fluid therefrom in the event of an excessive current passing through the electrode 12 and the solenoid 63. This release of the fluid from the cylinder 11 causes the piston 9 to descend and the point of the electrode to recede from the work whilst the work simultaneously moves back a corresponding distance until the proper arc length is obtained and normal working thus restored. The return movement of the work and the electrode may be conveniently effected by any suitable means such as a weight 80 connected to a line 85 which is in turn connected to the work carriage 6. The release valve 81 is opened by the downward movement of the solenoid rod 62 which is arranged in longitudinal alignment therewith and is adapted to strike the release valve when an excessive current passes through the solenoid and the rod 62 is consequently drawn downwardly to a sufficient extent. This causes the pressure fluid to be released from the release pipe 82 into a chamber 83 which contains a fluid tight piston 84 pressed inwardly by a spring 86 and adjusted by a screw 87 and hand wheel 88 whereby the inward pressure of the spring 86 and the capacity of the chamber 83 may be adjusted. When the release valve 81 again closes owing to the return of the solenoid rod 62 as the electrode recedes from the work and the strength of the electric current consequently falls, the released fluid in the chamber 83 is forced out by the piston 84 through a by-pass 89 to the outer side of a hand controlled valve or cock 91 in the release pipe 82. This hand valve 91 permits the carriage and the electrode to be quickly moved backwardly at the will of the operator, for instance, when it is desired to return the carriage to its starting point.

A secondary fluid supply pipe 92 may lead into the main supply pipe 56 the pipe 92 being fitted with a hand controlled valve 93 whereby fluid may be admitted to the cylinder 11 independently of the automatic control valve 54, for instance, when it is desired to advance the carriage 6 to bring the work into the desired position for starting.

The instrument board 64 may carry various other parts such as a main switch 94, a voltage meter 96 and voltage control device 97, an ampere meter 98 and amperage control device 99, and a water pressure gauge 95 adapted to indicate any fault in the pressure fluid supply. These instruments may be of any appropriate construction and the current supply wires indicated at 101 may be connected with the electrode and the work to form the arc in the usual manner. The numeral 102 in Figure 3 indicates a hand opening whereby the operator may obtain access to the work and other adjacent parts.

To automatically strike or initiate the arc between the point of the electrode and the work, the upper or rear end of the electrode rod 12 may be attached as at 105 to the moving member of an electro-magnet such as the sliding core 103 of a solenoid 104 as seen in Figure 4. This solenoid may be attached to the electrode holder or carrier 15 previously referred to so that the solenoid 104 may be moved bodily with the electrode towards the work by the operating line 13 as before mentioned. In striking the arc the electrode is first advanced by manipulation of the hand wheel 49 until the point of the electrode is disposed at some little distance from the work. Fluid is then admitted to the cylinder 11 by manipulation of the adjusting screw 58 of the control valve 54 so that the point of the electrode is moved closer to the work by the movement of the piston 9. Immediately the point of the electrode touches or approaches sufficiently close to the work the current commences to flow through the electrode and across the arc gap, thus energizing the solenoid 104 which is in circuit with the electrode. The sliding member or core 103 of the electromagnet is thus caused to move back with the electrode thereby drawing the point of the latter away from the work until the proper arc length position is reached. The degree of backward movement of the member 103 and consequently the desired arc length position of the electrode may be adjusted according to requirements by means of an adjustable stop or nut 106 engaging an adjacent fixed stop or abutment 107.

In order to automatically register or record the occurrence of breaks in the welded joint and other information such as the time occupied in welding given lengths of joint and other operations such as the changing of the work and the electrode a telltale mechanism including a suitable clockwork indicated at 111 (Figure 3) may operate the recording tape 112 upon which a marker 113 bears when the current is flowing through the electrode. This marker may be controlled by an electromagnet 114 in circuit with the electrode so that when the current ceases to flow through the latter the marker will leave the tape 112 and a break will occur in the line marked upon the tape whereas when the current again flows through the electrode and welding operations are resumed the marker will again engage the tape, thereby automatically recording the continuity or otherwise of the welding operations. By this means any interruptions or breaks in the welded joint will be clearly indicated on the tape or chart 112 so that they may be remedied in the work thus ensuring that an efficient and non-leaky joint is produced.

To register on the tape or chart 112 the amount of work, such for instance as the length of tubing welded within a given time, a rotary measuring device or counter 116, working on the cyclometer principle may be arranged to press against and mark the tape as each foot or other desired length of work is treated. This may be effected by means of strikers 117 arranged at suitable spaced intervals along the traversing work carriage 6 and adapted to engage a roller or tappet 118 (Figure 5) carried on the lower end of an intermediately pivoted arm 119, the operation of which causes the counter and marker 116, which may be normally pressed outwardly by a spring 121 (Figure 5), to be pressed inwardly against the tape as each striker 117 engages the tappet 118. The counter 116 may be provided with a suitable operating arm or arms 122 adapted to engage a stop or abutment 123 whereby the counter is operated on each inward movement of the upper end of the arm 119 immediately before the counter engages the tape. The new number thus brought to the operative face of the counter is thereby impressed on the tape 112, either through the medium of a carbon sheet 120 or otherwise, thus registering at intervals on the chart the length of work treated.

By the above described telltale mechanism a complete record of operations is obtained, thus affording highly useful information as to the existence of faults in the welded joints, the amount of work done in certain periods, and other data serving to improve results and ensure economical production.

To rotate or circumferentially traverse the work beneath the electrode 12 during the welding of circumferential joints as for instance in joining together the ends of a plurality of metal pipe sections the piping may be mounted upon idle supporting wheels indicated at 126 in Figure 6 and the ends of the tube sections may be temporarily held together by spot welding or other suitable means. A flexible operating line such as the first operating line 5 previously referred to is passed around the periphery of the pipe and fastened at one end to the latter and at its other end to the piston 9 working within the hydraulic cylinder 11. The electrode 12 may also be connected to the piston 9 by means of the second operating line 13 and the adjusting lever 18 previously referred to so that by automatically controlling the admission of the fluid to the cylinder 11 as previously described the work may be circumferentially traversed at the correct welding speed and the electrode fed towards the work at the desired relative speed according to requirements. In this case a single guide wheel 42 may be provided to run in the circumferential jointing groove such as the groove or space indicated at 125 in Figures 10 and 13 between the adjoining ends of two pipe sections which are to be welded together. This guide wheel 42, which serves to keep the electrode in its proper position immediately over the joint, may be carried at the lower end of a guide bar 27. This guide bar may be vertically and angularly adjusted as at 128 on a suitable support 129 the upper end of said guide bar being also adjustably attached as at 130 to the aforesaid horizontal bar 33 to thereby guide the electrode holder 15 in the desired path the electrode guiding sleeve 37 being attached for instance to the lower part of the guide bar 127 as shown in Figure 6. Means such as a winding drum or winch 17 may also be provided in this example to manually advance the electrode independently of the movement of the work as previously mentioned. Any suitable means such as a weight 80 and line 85 may be utilized to automatically turn the work in a reverse direction when the piston 9 falls and the electrode recedes from the work owing to the release of the pressure fluid from cylinder 11 on the passage of an excessive current through the solenoid 63.

In the arc welding of metal pipes by existing means difficulties are frequently experienced in retaining the molten metal directly beneath the electrode particularly when the two meeting edges to be welded are entirely fused in forming the joint. This difficulty is due to the molten metal leaking out between the plates being welded and the mandrel or bearer which underlies the joint, such leakage of the metal being liable to leave a gap or opening which causes the arc to extinguish and resulting in a faulty weld. To obviate such escape of the molten metal I provide a mandrel or bearer 131 (Figures 7 to 14) having therein a groove or channel 132 adapted for disposition immediately beneath the joint and the electrode. The plate or object to be welded, such for instance as the sheet metal pipe 7, may be clamped, spot welded or otherwise temporarily secured to this grooved mandrel or bearer with the edges to be joined disposed close to each other so that during the welding operation the molten metal is caught in the groove or channel 132 with the result that the fused metal immediately chills, thus as the metal plate and the electrode is fused the molten metal is built up along the joint thereby maintaining the correct arc length and ensuring a homogeneous and efficient welded joint.

The grooved mandrel or bearer 131 may be in the form of a straight bar having the groove or channel 132 extending lengthwise thereof to lie immediately beneath the longitudinal joint formed between the meeting edges 8 of a sheet metal pipe or the like as seen in Figures 7, 11 and 12. Or alternatively the grooved mandrel or bearer 131 may consist of a peripherally grooved wheel or roller which is positioned beneath and against the work or within the pipe immediately beneath the joint as indicated in Figures 8, 9 and 10 so that as the work is traversed on said wheel the molten metal is retained within the groove 132 as aforesaid. In forming the longitudinal joints the axis of the peripherally grooved mandrel wheel 131 is disposed at right angles to the length of the pipe as in Figures 8 and 9 whereas in forming a circumferential joint the axis of the wheel is disposed parallel to the length of the pipe as in Figure 10.

As shown in Figures 11 to 14 it is preferred to mount the mandrel or bearer 131 on a collapsible support such as a flexible tubular body 133 of canvas, rubber or like material which when filled with a fluid such as water expands and forces the grooved outer face of the mandrel or bearer outwardly against the joint as shown. By this means the mandrel or bearer 131 is maintained securely in its operative position irrespective of the size of diameter of the work under treatment, the collapsible support or bag being disposed for instance inside a pipe being welded so that on the admission of the fluid into the bag the latter will expand to the desired extent according to the internal diameter of the pipe against which the grooved mandrel is pressed as aforesaid.

Figure 13:
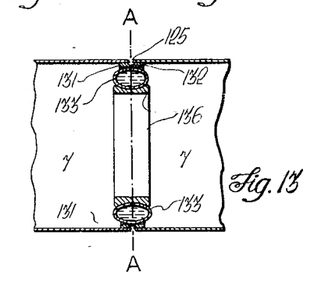
Figure 13 is a longitudinal section showing said collapsible bag or support applied to a grooved mandrel or bearer in the formation of a circumferential joint.
Figure 14:
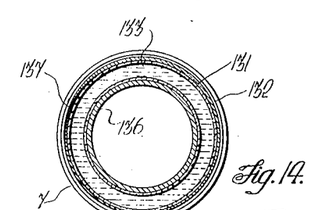
Figure 14 is a cross section on line A—A of Figure 13.

When used in the formation of longitudinal joints the collapsible mandrel support or bag 133 may be in the form of a substantially straight sleeve which passes longitudinally through the pipe and may rest thereon upon a suitable stand or frame 134 (Figures 11 and 12) which is adapted to accommodate the collapsible bag in either its compressed or expanded state. When applied to the formation of circumferential joints the collapsible bag 134 may be in the form of a circular sleeve attached to the outer periphery of a ring 136 which is disposed within a similar circular mandrel or bearer 131 as shown in Figures 13 and 14. In this case the mandrel or bearer 131 is of an expansible and contractible nature and may consist of a flexible band of metal or other suitable material having its ends overlapped as at 137 (Figure 14) so that it may expand and contract to the desired size or diameter with the bag 133, the groove 132 being formed in the outer face of the mandrel or bearer which is pressed outwardly against the inner face of the circumferential joint as shown. In this example the grooved mandrel or bearer together with its collapsible support 133 and the ring 136 may turn with the work or tube 7 during the circumferential traversing movement of the latter.

Besides enabling the grooved mandrel or bearer to be pressed closely against the joint and to readily adapt itself to work of different sizes or diameters as above indicated the above arrangement of the mandrel or bearer 131 upon the collapsible support or bag has the additional advantage that the fluid within the bag exerts a cooling effect upon the mandrel or bearer 131 so that the molten metal which collects within the groove or channel 132 immediately chills and ensures the formation of an effective welded joint.

A suitable valve or valves may be provided to control the supply and discharge of the fluid to and from the collapsible support 133, for instance through a supply pipe 138 as indicated in Figure 12.

Whilst the foregoing description has been directed more particularly to an arrangement in which the work is traversed whilst the electrode remains stationary, it will be obvious that as an alternative mode of effecting the same result the electrode may be arranged to traverse as well as feed forwardly towards the work whilst the latter remains stationary. Such traversing movement of the electrode may also be effected by fluid operated means in a manner similar to that described for traversing the work. It is, therefore, to be understood that where reference is made in the appended claims to means for traversing the work in relation to the electrode, the expression shall, where the meaning permits, be interpreted to include an arrangement in which the electrode is traversed along the work whilst the work remains stationary.

It will also be obvious that the invention is not limited in its usefulness to the welding of metal pipes but may be applied to arc welding operations in general.

Having now described my invention what I claim as new and desire to secure by Letters Patent is:—

1. Electric arc welding apparatus comprising a fluid operated member, an electrode, flexible operating lines connecting said member to the electrode and the work to be welded, means whereby the electrode is fed towards the work and the work is traversed in relation to the electrode synchronously with said feeding movement of the latter, and adjusting means interposed in one of said flexible operating lines for adjusting the rate of the electrode feeding movement relatively to the rate of said traversing movement.

2. Electric arc welding apparatus characterized by a fluid operated member operatively connected to the electrode and the work whereby the electrode is fed towards the work and the work is traversed in relation to the electrode synchronously with said feeding movement of the latter, and adjusting means consisting of a pivoted arm or lever having longitudinally spaced adjusting holes or connections adapted to receive the adjacent ends of a flexible operating line which connects the electrode with the work or a part moving therewith, whereby the rate of the electrode feeding movement relative to the rate of said traversing movement may be adjusted for the purpose specified.

3. Electric arc welding apparatus characterized by a fluid operated member connected by flexible operating lines to the electrode and the work whereby the electrode is fed towards the work and the work is traversed in relation to the electrode synchronously with said feeding movement of the latter, and adjusting means consisting of a pivoted arm or lever which is connected to the work or a member moving therewith by a section of said operating lines another operating line section being connected between said lever and the electrode substantially as and for the purpose specified.

4. Electric arc welding apparatus characterized by a fluid operated member connected by a flexible operating line to the electrode and the work whereby the electrode is fed towards the work and the work is traversed in relation to the electrode synchronously with said feeding movement of the latter, and a winding drum or winch connected to one of said flexible operating lines and adapted to move with the work in its traversing movement whereby the electrode may be manually advanced towards the work whilst the work remains stationary for the purpose of adjusting the electrode relative to the work before starting the welding operation.

5. In automatic electric arc welding apparatus electrode guiding wheels mounted on a pivoted rocking bar, and adapted to track in a groove or gap between the adjoining edges of the work to be welded for the purpose specified.

6. In automatic electric arc welding apparatus electrode guiding wheels mounted on a pivoted rocking bar, and adapted to track in a groove or gap between the adjoining edges of the work to be welded, and spring means adapted to press said electrode guiding wheels against the work for the purpose specified.

7. In automatic electric arc welding apparatus electrode guiding wheels mounted on a pivoted rocking bar, and adapted to track in a groove or gap between the adjoining edges of the work to be welded, and a guide sleeve supported by said guiding wheels and adapted to accommodate the electrode which passes through said sleeve substantially as and for the purpose specified.

8. In automatic electric arc welding apparatus electrode guiding wheels mounted on a pivoted rocking bar, and adapted to track in a groove or gap between the adjoining edges of the work to be welded, an upwardly extending angularly adjustable rod pivoted at its lower end to said rocking bar, a guide sleeve attached to said adjustable rod and adapted to accommodate the electrode, and a spring fitted to said rod whereby said guiding wheels are pressed against the work substantially as described.

9. In automatic arc welding apparatus, electrode guiding wheels mounted on a pivoted rocking bar, and adapted to track in a groove or gap between the adjoining edges of the work to be welded, and means for laterally adjusting said guiding wheels and the electrode in relation to the work for the purpose specified.

10. In electric arc welding apparatus a work supporting cradle pivotally mounted to swing laterally upon a traversing carriage substantially as described.

11. An electric arc welding apparatus, comprising an electrode, fluid operated means for feeding the electrode towards the work, a hydraulic control valve, electrically operated means acting upon said control valve to regulate the supply of fluid whereby the electrode is fed towards the work in accordance with fluctuations in the current passing through said electrode, and means for operating said control valve independently of said electrically operated means.

12. In electric arc welding apparatus hydraulically operated means adapted to automatically feed the electrode towards the work, a control valve governing the flow of hydraulic fluid whereby said electrode feeding movement is effected, a solenoid rod or core operatively connected to an arm of said control valve for automatically operating the latter, a spring connected to the solenoid rod and adapted to act in opposition to the pull of the solenoid, and means for adjusting the tension of said spring for the purpose specified.

13. In electric arc welding apparatus hydraulically operated means adapted to automaticlly feed the electrode towards the work, a control valve governing the flow of hydraulic fluid whereby said electrode feeding movement is effected, a solenoid rod or core operatively connected to an arm of said control valve for automatically operating the latter, a spring connected to the solenoid rod and adapted to act in opposition to the pull of the solenoid, means for adjusting the tension of said spring, and manual operating means embodying a screw adjustment for initially opening said valve for the purpose specified.

14. In electric arc welding apparatus fluid operated means adapted to automatically feed the electrode towards the work, a control valve governing the flow of fluid whereby said electrode feeding movement is effected, a solenoid rod or core operatively connected to said control valve whereby the latter is opened and closed by movement of the solenoid rod in opposite directions in accordance with fluctuations in the current passing through the electrode and said solenoid, and stops associated with said solenoid rod and adapted to limit or arrest the automatic opening and closing movements of said control valve for the purpose specified.

15. In electric arc welding apparatus fluid operated means adapted to automatically feed the electrode towards the work, a control valve governing the flow of fluid whereby said electrode feeding movement is effected, a solenoid rod or core operatively connected to said control valve whereby the latter is opened and closed by movement of the solenoid rod in opposite directions in accordance with fluctuations in the current passing through the electrode and said solenoid, and a spring stop adapted to arrest the automatic closing movement of the control valve for the purpose specified.

16. In electric arc welding apparatus fluid operated means adapted to automatically feed the electrode towards the work and synchronously traverse the work in relation to the electrode, electrically operated means in circuit with the electrode and adapted to control the supply of fluid whereby said electrode feeding and traversing movements are effected, and means to automatically release the fluid from said fluid operated means when an excessive current passes through the electrode for the purpose specified.

17. In electric arc welding apparatus fluid operated means adapted to automatically feed the electrode towards the work, a release valve adapted to control the escape of the fluid from said fluid operated means, an electro-magnet connected in circuit with the electrode and adapted to open said release valve when an excessive current passes through the electrode, a releasing chamber adapted to receive the escaping pressure fluid from said release valve, and means whereby said fluid is discharged from the releasing chamber when the release valve is closed for the purpose specified.

18. In electric arc welding apparatus fluid operated means adapted to automatically feed the electrode towards the work, a release valve adapted to control the escape of the fluid from said fluid operated means, an electro-magnet connected in circuit with the electrode and adapted to open said release valve when an excessive current passes through the electrode, a releasing chamber adapted to receive the escaping pressure fluid from said release valve and a piston disposed within said releasing chamber to discharge the fluid from said chamber when the release valve closes, for the purpose specified.

19. In electric arc welding apparatus fluid operated means adapted to automatically feed the electrode towards the work, a release valve adapted to control the escape of the fluid from said fluid operated means, an electro-magnet connected in circuit with the electrode and adapted to open said release valve when an excessive current passes through the electrode, a releasing chamber adapted to receive the escaping pressure fluid from said release valve, a piston disposed within said releasing chamber, a spring adapted to press said piston inwardly into the releasing chamber to thereby force the fluid therefrom when the release valve closes, and means for adjusting the position of said piston to vary the capacity of said releasing chamber for the purpose specified.

20. In electric arc welding apparatus fluid operated means adapted to automatically feed the electrode to the work and traverse the work in relation to the electrode, a fluid supply pipe and a fluid releasing pipe passing respectively to and from said fluid operated means, said supply pipe being fitted with an automatically operated control valve and connected with a subsidiary fluid supply pipe which is fitted with a hand operated valve, said release pipe being also provided with a hand operated valve for the purpose specified.

21. In electric arc welding apparatus the combination of an arc striking device consisting of an electro-magnet connected in circuit with the electrode which is attached to the moving element of said electro-magnet whereby the point of the electrode is automatically withdrawn to the desired arc length position from the work on the energization of said electro-magnet due to the electrode point approaching sufficiently close to the work to strike or initiate the arc, a fluid operating member, a flexible operating line connecting said fluid operating member with said arc striking device, and an electrically operated control device adapted to control the flow of fluid to or from said fluid operated member whereby the electrode and said arc striking device are fed bodily towards the work at a speed which is governed by fluctuations in the current passing through the electrode for the purpose specified.

22. Electric arc welding apparatus characterized by a fluid operated member, and a flexible operating line connected to said fluid operating member and passing around the work, such as a metal pipe, or a member adapted to turn therewith whereby the work is rotated or circumferentially traversed by the movement of said fluid operated member substantially as and for the purpose specified.

23. In electric arc welding apparatus the combination of a work support, a hydraulic cylinder, a plunger working in said cylinder, a flexible operating line connecting said work support and the plunger, an electrode holder arranged above said work support and adapted to hold a straight electrode rod, means connecting said plunger to said electrode holder whereby the electrode is fed point downwardly to the work by the movement of the hydraulic plunger, a valve associated with said cylinder and controlling the flow of hydraulic fluid whereby the feeding movement of the electrode is effected, an operating arm to said valve, and electrically operated means connected into the welding circuit and acting on said arm to automatically operate said valve in accordance with fluctuations in the arc length during the welding operation.

24. In electric arc welding apparatus the combination of a hydraulic cylinder, a plunger working in said cylinder, an arc striking device connected to said plunger and consisting of a solenoid wound in circuit with the electrode, the core of said solenoid being adapted for attachment to the electrode whereby the point of the latter is automatically withdrawn to the desired arc length position on the energization of said solenoid due to the electrode point approaching sufficiently close to the work to strike the arc, a valve associated with said cylinder and controlling the flow of hydraulic fluid whereby said arc striking device and the electrode are fed bodily towards the work, and an electrical control device connected into the welding circuit and adapted to automatically actuate said valve in accordance with fluctuations in the arc length during the welding operation.

25. Electric arc welding apparatus comprising a work carriage, hydraulically operating means adapted to automatically feed the electrode to the work, a control valve adapted to regulate the flow of fluid whereby the electrode may be adjusted, and a flexible connecting line for the operating means and the carriage.

26. Electric arc welding apparatus comprising a work carriage, a fluid operated member, an electrode, flexible operating lines connecting said carriage to the electrode and the work carriage to the member, and means whereby said electrode is fed towards the work and the work is traversed in relation to the electrode synchronously with said feeding movement of the latter.

27. Electric arc welding apparatus comprising a work carriage, an electrode, fluid operated means adapted to automatically feed the electrode to the work and traverse the work in relation to the electrode synchronously with said feeding movement of the electrode, and means for adjusting the rate of the electrode feeding movement relatively to the rate of said traversing movement.

28. Electric arc welding apparatus comprising a work carriage, an electrode, means for moving said carriage, a fluid operated means adapted to automatically feed the electrode to the work and traverse the work in relation to the electrode synchronously with the feeding movement of the latter, and means for advancing the electrode towards the work while the work remains stationary for the purpose of adjusting the electrode relative to the work before starting the welding operation.

29. An electric arc welding apparatus comprising an electrode, a traversing carriage adapted to support the object to be welded, a hydraulically operated piston for operating said carriage, a flexible operating line connecting said piston to said carriage, and a second operating line connecting the electrode to said carriage.

30. An electric arc welding apparatus comprising an electrode holder adapted to carry a straight electrode rod, a work carriage, a fluid operated member, and a flexible operating line connecting said fluid operated member with said work carriage and the carriage with the electrode rod whereby the electrode is automatically fed point downwardly towards the work.

31. An electric arc welding machine comprising an electrode, a work carriage, a flexible operating line, fluid operated means adapted to automatically feed the electrode towards the work and connected with the carriage by the operating line, and electrically operated means adapted to control the flow of fluid to or from said fluid operated means.

32. An electric arc welding apparatus, comprising an electrode, a work carriage, hydraulically operated means for feeding the electrode towards the work, a flexible operating line connecting the hydraulically operated means with the carriage, a hydraulic control valve associated with said means, and electrically operated means acting upon said control valve to regulate the supply of hydraulic fluid whereby the electrode is fed towards or withdrawn from the work in accordance with fluctuations in the current passing through said electrode.

In testimony whereof I hereunto affix my signature.

W. R. HUME.